(12) United States Patent
Mazzouji et al.

(10) Patent No.: US 8,491,269 B2
(45) Date of Patent: Jul. 23, 2013

(54) HYDRAULIC MACHINE INCLUDING MEANS FOR INJECTING A FLOW DRAWN FROM A MAIN FLOW

(75) Inventors: Farid Mazzouji, Vourey (FR); Monique Traversaz, Gieres (FR)

(73) Assignee: Alstom Hydro France, Levallois Perret (FR)

( * ) Notice: Subject to any disclaimer, the term of this patent is extended or adjusted under 35 U.S.C. 154(b) by 592 days.

(21) Appl. No.: 12/452,822

(22) PCT Filed: Jul. 23, 2008

(86) PCT No.: PCT/FR2008/051384
§ 371 (c)(1),
(2), (4) Date: Jan. 25, 2010

(87) PCT Pub. No.: WO2009/016314
PCT Pub. Date: Feb. 5, 2009

(65) Prior Publication Data
US 2010/0129201 A1 May 27, 2010

(30) Foreign Application Priority Data
Jul. 23, 2007 (FR) ...................................... 07 05332

(51) Int. Cl.
*F03B 11/02* (2006.01)
(52) U.S. Cl.
USPC ...................................................... 416/231 R
(58) Field of Classification Search
USPC ........................................ 415/115; 416/231 R
See application file for complete search history.

(56) References Cited

U.S. PATENT DOCUMENTS

| 1,942,995 | A | * | 1/1934 | Biggs | 415/115 |
| 1,950,777 | A | | 3/1934 | Biggs | |
| 2,079,258 | A | | 5/1937 | Logan | |
| 3,238,543 | A | | 3/1966 | Escher | |
| 4,146,352 | A | * | 3/1979 | Yasugahira et al. | 415/144 |
| 4,355,949 | A | * | 10/1982 | Bailey | 415/35 |
| 5,879,130 | A | * | 3/1999 | Beyer et al. | 415/115 |
| 6,155,783 | A | * | 12/2000 | Beyer | 416/90 R |
| 6,247,893 | B1 | * | 6/2001 | Beyer et al. | 415/115 |
| 6,454,533 | B2 | * | 9/2002 | Beyer | 416/90 R |
| 6,524,063 | B1 | | 2/2003 | Beyer | |
| 7,549,282 | B2 | * | 6/2009 | Widenhoefer et al. | 60/39.17 |
| 2010/0129198 | A1 | * | 5/2010 | Mazzouji et al. | 415/115 |
| 2010/0129201 | A1 | * | 5/2010 | Mazzouji et al. | 415/116 |

FOREIGN PATENT DOCUMENTS

| DE | 920 234 C | 11/1954 |
| DE | 1187559 B | * 2/1965 |

(Continued)

*Primary Examiner* — Edward Look
*Assistant Examiner* — Christopher R Legendre
(74) *Attorney, Agent, or Firm* — Dowell & Dowell, PC

(57) ABSTRACT

The invention relates to a machine through which a main flow (E) of water passes, including a turbine wheel (4), with at least a turbulent zone, reduced-pressure zone or cavitation zone (8, 10, 33) being formed close to said wheel. The wheel includes blades (6) disposed between a ceiling (28) and a belt (30). The machine also includes means for injecting a flow ($E_2$) drawn from the main flow into the aforementioned zone (8, 10, 33) such as to alter the main flow (E) locally or increase the pressure in said zone (8, 10, 33). Said injection means inject the drawn flow ($E_2$) from the ceiling (28) or from the belt (30) through holes (31, 32) provided in the ceiling (28) or belt (30).

6 Claims, 2 Drawing Sheets

FOREIGN PATENT DOCUMENTS

| | | | |
|---|---|---|---|
| DE | 1528821 A1 | 10/1969 | |
| JP | 62195467 A | * | 8/1987 |
| JP | 08074726 A | * | 3/1996 |
| JP | 2005171828 | | 6/2005 |

* cited by examiner

HYDRAULIC MACHINE INCLUDING MEANS FOR INJECTING A FLOW DRAWN FROM A MAIN FLOW

BACKGROUND OF THE INVENTION

1. Field of the Invention

The present invention relates to a Francis type hydraulic machine of the type traversed by a main flow of water, comprising a wheel of a turbine in the vicinity of which is formed at least one eddy zone or a reduced-pressure zone or a cavitation zone, the wheel comprising blades arranged between a ceiling and a belt, the machine comprising means of injecting a flow tapped from said main flow, not modified relative to the main flow, into said eddy or reduced-pressure or cavitation zone so as to locally modify the main flow or increase the pressure in this zone.

2. Brief Description of the Related Art

Such a machine is used, for example, in a plant for producing hydroelectricity. The machine is installed in the path of the current or is supplied with water from a reservoir into which one or more water courses are discharged.

In these hydraulic machines, there are zones in which the main flow traversing the machine is disturbed and forms eddies or exhibits a reduced pressure or cavitation zones, because of the configuration of the machine. Such zones disrupt the general performance of the hydraulic machine because they reduce the efficiency of action of the main flow in the hydraulic machine or cause problems of operation of the hydraulic machine.

The document U.S. Pat. No. 1,942,995 describes a hydraulic machine of the abovementioned type, making it possible to inject a flow tapped from the main flow into the cavitation zone being formed along the blades of the wheel of the turbine.

However, such a machine does not make it possible to effectively increase the pressure in the spaces extending between the blades where reduced-pressure zones are formed or eliminate the eddy zones that are also formed between the blades.

SUMMARY OF THE INVENTION

One of the objects of the invention is to alleviate these drawbacks by proposing a hydraulic machine making it possible to eradicate the eddy, reduced-pressure and cavitation zones in a simple manner at the same time.

Accordingly, the invention relates to a hydraulic machine of the aforementioned type, in which said means injecting taps flow from the ceiling or from the belt by means of openings formed in the ceiling or in the belt.

The injection of a flow tapped from the ceiling or from the belt makes it possible to effectively make good the lack of performance in the action of the main flow in these zones, which improves the performance and behaviour of the hydraulic machine, and to choose precisely the places where the tapped flow must be injected to eliminate the cavitation zones and the reduced-pressure zones or the eddy zones.

According to other features of the hydraulic machine:
 the injection means comprise at least one duct comprising an inlet tapping off a flow from the main flow upstream of the rotor and an outlet opening into the eddy or reduced-pressure or cavitation zone,
 the injection means comprise a valve placed in the path of the tapped flow, the said valve being able to be moved between an open position in which it allows the tapped flow to pass from the main flow and a closed position in which it prevents the passage of the tapped flow,
 the movement of the valve is controlled by control means,
 the openings made in the ceiling or in the belt lead into the spaces between the blades,
 the tapped flow passes through openings made in the ceiling or the belt opposite the blades of the rotor and is injected onto the profile of the said blades via orifices arranged in a side wall of the said blades in the vicinity of the upstream end and/or of the downstream end of the said blades,
 the tapped flow passes through openings made in the ceiling or the belt opposite the blades of the rotor and is injected into the downstream end of the blades.

BRIEF DESCRIPTION OF THE DRAWINGS

Other aspects and advantages of the invention will appear during the following description, given as an example and made with reference to the appended drawings in which.

DESCRIPTION OF THE PREFERRED EMBODIMENT

The invention described below applies to hydraulic machines of the Francis turbine type. Since this machine is known, it is not described in detail in the present description. The invention also applies to other types of hydraulic machines in which problems of the formation of eddy, reduced-pressure or cavitation zones occur.

In the description, the terms "upstream" and "downstream" are defined with respect to the direction of flow of the main flow E traversing the hydraulic machine.

Figure 1:
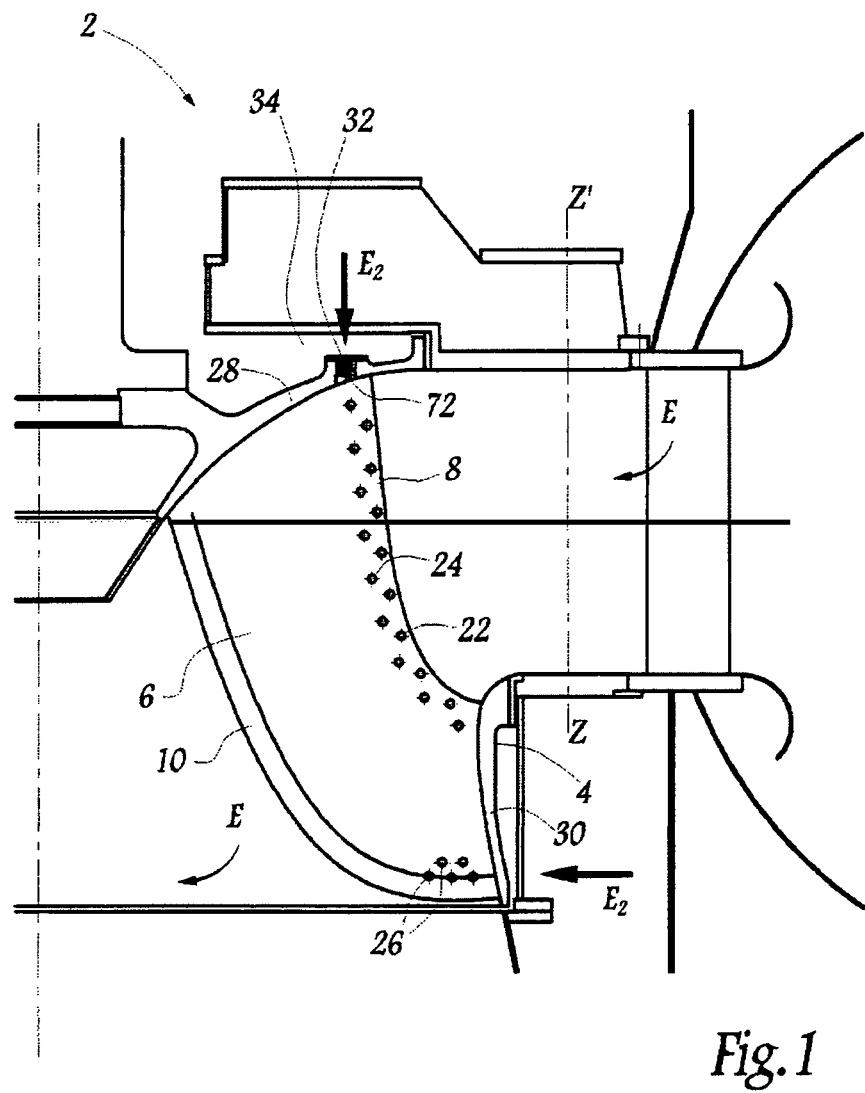
FIG. 1 is a partial schematic representation in section of a Francis turbine according to the invention.

FIG. 1 shows a Francis turbine 2 comprising a wheel 4 comprising blades 6 arranged between a ceiling 28 and a belt 30.

In the case of a blade 6, there is a problem of the creation of cavitations on the profile of the blades 6 of the rotor 4 in a zone in the vicinity of the inlet edges or upstream end 8 and/or of the outlet edges or downstream end 10 of the blades. In order to alleviate this drawback, the blade 6, shown in FIG. 1, comprises ducts (not shown) extending inside the blade between an inlet opening 22 and an outlet opening 24, 26. The inlet openings 22 of the ducts are placed in the vicinity of the upstream end 8 of the blade 6 so as to tap off a flow from the main flow E upstream of the blade. The outlet openings 24, 26 of the ducts are arranged to inject the tapped flow on the side walls of the blades 6 in the vicinity of the upstream end 8 and/or of the downstream end 10 of the blade 6. The effect of the tapped and injected flow is to locally modify the main flow E and thereby to prevent the phenomena of forming cavitation on the profile of the blades. Certain ducts therefore comprise an outlet opening 24 leading into a side wall of the blade 6 in the vicinity of the upstream end 8 in order to prevent the phenomena of forming cavitation on the blades in the vicinity of the upstream end 8. Other ducts comprise an outlet opening 26 opening into a side wall of the blade 6 in the vicinity of the downstream end 10 in order to prevent the phenomena of forming cavitation on the blades in the vicinity of the downstream end 10.

According to various embodiments, the inlet and outlet openings may be placed in series along the upstream end 8 and the downstream end 10 of the blade 6 in a direction which may be perpendicular to the direction of the main flow E, as shown by the outlet openings 24 of FIG. 1.

According to a particularly advantageous embodiment, outlet openings are arranged so as to open into the downstream end 10 of the blade 6 in the direction of the main flow E. The injection of the tapped flow into the downstream end makes it possible to eliminate the eddy zone which is formed in the trail of the blades 6. The tapped flow is, for example, injected into the base of the downstream end 10 of the blade 6.

The blades 6 of the rotor 4 are placed between a ceiling 28 and a belt 30.

Figure 2:
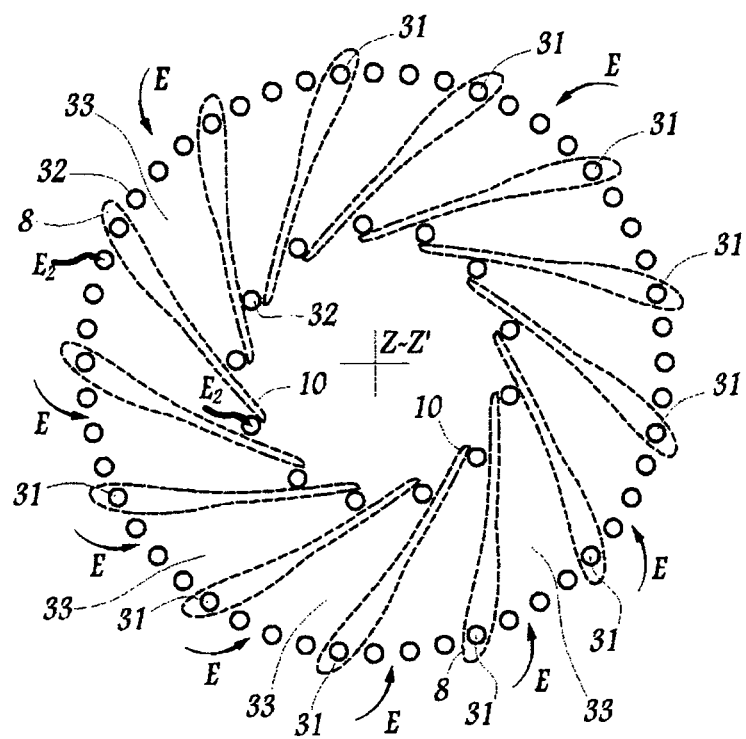
FIG. 2 is a schematic representation seen from above of the Francis turbine rotor of FIG. 1.

According to the invention, the phenomena of cavitation on the blades are prevented by openings 31 made in the ceiling 28 opposite the blades 6, as shown in FIG. 2. These openings 31 communicate with the outlet openings 24 and 26 and with the outlet openings opening into the downstream end 10 by means of channels not shown. The flow $E_2$ is tapped off from the main flow E supplying the Francis turbine 2 upstream of the blades 6. The tapped flow $E_2$ passing between the fixed part and the moving blades of the turbine 2 then entering an annular space situated above the ceiling 28 may, for example, be conveyed by means of ducts not shown. This flow $E_2$ enters the openings 31 and is then guided to the outlet openings 24, 26.

In addition to the cavitation phenomena on the blades, there may also be phenomena of forming a vortex in the space 33 between the blades 6. These phenomena may be alleviated by means of ducts, the inlet and outlet orifices of which are placed between the upstream and downstream ends of the blades and open into the space 33 between the blades. According to one embodiment, the problem of forming a vortex between the blades 6 is solved by means of orifices 32 made in the ceiling 28, as shown in FIG. 1.

In this embodiment, the flow $E_2$ tapped off in the annular space 34 travels into the openings 32 and supplies the spaces 33 between the blades 6, as shown in FIGS. 1 and 2. The openings 32 are distributed in the ceiling 28 facing the spaces 33 separating the blades 6. Therefore, the tapped flow $E_2$ is injected between the blades 6 and modifies the properties of the flow E in order to prevent the phenomena of forming a vortex between the blades 6.

As a variant, instead of or in addition to travelling via the ceiling 28, the tapped flow $E_2$ can travel through the belt 30 by means of openings (not shown) made in the latter.

The openings 31, 32 formed in the ceiling 28 and/or the belt 30 thus make it possible to overcome, in a simple manner and altogether, the problems of formation of cavitation zones on the blades, of vortex-formation zones between the blades and of eddies downstream of the blades.

According to an embodiment that can be applied to all the injection means described above, the injection means comprise a valve 72 placed in the path of the tapped flow, as shown in FIG. 1. The valve 72 can be moved between an open position in which it allows the tapped flow to pass and a closed position in which it prevents the passage of the tapped flow. The valve 72 is for example placed in the vicinity of each inlet opening of the injection means and makes it possible manually or automatically to control the injection of the tapped flow. In the case of the Francis turbine, the valve 72 is provided in the vicinity of each opening 32 arranged in the ceiling 28.

The movement of the valve 72 is controlled by control means (not shown) which are mechanical or electric in a manner known per se. Therefore, during operating conditions of the hydraulic machine causing the formation of eddy or reduced-pressure or cavitation zones, an automatic system or an operator of the machine switches the valve(s) to the open position which makes it possible to inject the tapped flow in the said zones and to prevent the formation of these zones, as described above.

It should be noted that the tapped flow is not modified relative to the main flow E, that is to say that the water does not sustain any operation to modify its composition during the tapped flow.

The invention claimed is:

1. A Francis type hydraulic machine traversed by a main flow (E) of water, comprising a rotor of a turbine which rotor includes a plurality of blades, arranged between a ceiling and a belt, in the vicinity of which eddy zones, reduced-pressure zones or cavitation zones can be formed along side walls of the blades adjacent the leading and trailing edges of the blades and between the blades as the rotor rotates during use, a plurality of inlet openings in the side walls of the blades adjacent the leading edges of the blades for tapping flow from the main flow (E) and a plurality of outlet openings in the side walls of the blades adjacent both the leading and trailing edges of the blades for injecting the flow tapped from the main flow (E) through the plurality of inlet openings, into the eddy, reduced-pressure or cavitation zones along the side walls of the blades as the rotor rotates so as to modify the main flow (E) or increase pressure of the main flow (E) in the eddy zones, reduced-pressure zones or cavitation zones along the side walls of the blades, and other openings formed in the ceiling and the belt for injecting a flow ($E_2$) tapped from the main flow(E) between the blades through other outlet openings.

2. The hydraulic machine according to claim 1, including at least one duct within each blade for communicating the plurality of inlet openings for tapping off the flow from the main flow (E) with the plurality of outlet openings.

3. The hydraulic machine according to claim 2, including a valve placed within each of the other openings in the ceiling, each valve being operable to move between an open position in which the valve allows the flow ($E_2$) tapped from the main flow (E) to pass to other outlet openings in the ceiling between the blades and a closed position in which the valve prevents the passage of the tapped flow ($E_2$) from the other outlet openings in the ceiling.

4. The hydraulic machine according to claim 3, including a control means for controlling opening and closing of the valves.

5. The hydraulic machine according to claim 1, wherein the tapped flow ($E_2$) also passes through the plurality of outlet openings in the side walls of the blades adjacent at least one of the leading and trailing edges of the blades.

6. The hydraulic machine according to claim 5, wherein the tapped flow ($E_2$) passes through the outlet openings formed in the side walls adjacent both the leading and trailing edges of the blades.

* * * * *